(12) United States Patent
Izumi et al.

(10) Patent No.: US 7,271,823 B2
(45) Date of Patent: Sep. 18, 2007

(54) OPTICAL SCANNER AND IMAGE FORMING APPARATUS

(75) Inventors: Yasutaka Izumi, Tokyo (JP); Yoshinori Hayashi, Tokyo (JP); Hiromichi Atsuumi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 242 days.

(21) Appl. No.: 10/927,226

(22) Filed: Aug. 27, 2004

(65) Prior Publication Data

US 2005/0093955 A1    May 5, 2005

(30) Foreign Application Priority Data

Aug. 29, 2003 (JP) ............................. 2003-306688
Sep. 19, 2003 (JP) ............................. 2003-328314

(51) Int. Cl.
*B41J 15/14* (2006.01)
(52) U.S. Cl. .................. 347/241; 347/244; 347/243
(58) Field of Classification Search ............... 347/233, 347/241–244, 256, 260, 261
See application file for complete search history.

(56) References Cited

U.S. PATENT DOCUMENTS

| | | | | |
|---|---|---|---|---|
| 3,813,140 A | * | 5/1974 | Knockeart | 359/218 |
| 4,862,196 A | * | 8/1989 | Umeda et al. | 347/232 |
| 4,863,227 A | * | 9/1989 | Takanashi | 359/207 |
| 4,930,869 A | * | 6/1990 | Miyagawa et al. | 359/205 |
| 5,233,454 A | | 8/1993 | Sakuma et al. | |
| 5,355,244 A | | 10/1994 | Suzuki et al. | |
| 5,408,095 A | | 4/1995 | Atsuumi et al. | |
| 5,426,298 A | | 6/1995 | Sakuma et al. | |
| 5,459,601 A | | 10/1995 | Suzuki et al. | |
| 5,475,522 A | | 12/1995 | Itabashi et al. | |
| 5,504,613 A | | 4/1996 | Itabashi et al. | |
| 5,557,448 A | | 9/1996 | Endo et al. | |
| 5,570,224 A | | 10/1996 | Endo et al. | |
| 5,581,392 A | | 12/1996 | Hayashi | |
| 5,606,181 A | | 2/1997 | Sakuma et al. | |
| 5,652,670 A | | 7/1997 | Hayashi | |
| 5,684,618 A | | 11/1997 | Atsuumi | |

(Continued)

FOREIGN PATENT DOCUMENTS

| | | |
|---|---|---|
| JP | 9-274134 | 10/1997 |
| JP | 2001-166250 A | 6/2001 |
| JP | 2001-290095 | 10/2001 |
| JP | 2001-318335 | 11/2001 |
| JP | 2001-350110 A | 12/2001 |
| JP | 2002-328327 A | 11/2002 |
| JP | 2003-131152 A | 5/2003 |

OTHER PUBLICATIONS

U.S. Appl. No. 10/642,173, filed Aug. 18, 2003, Ono, et al.

(Continued)

*Primary Examiner*—Hai Pham
*Assistant Examiner*—Kainoa Wright
(74) *Attorney, Agent, or Firm*—Oblon, Spivak, McClelland, Maier & Neustadt, P.C.

(57) ABSTRACT

An optical scanner has a deflector, a coupling lens, a cylindrical lens, a plate through which light to and from the deflector pass, and an optical system which condenses the light deflected on a surface to be scanned. Bundles of light beams incident on the deflector have an angle between the bundles in a rotating plane of the deflector, and expressions $0.6<(\theta 1max-\alpha)/(\theta 2+\alpha)<1.4$, and $0.6<(\theta 1min-\alpha)/(\theta 2+\alpha)<1.4$, are satisfied, where $\theta 1max$ and $\theta 1min$ are maximum and minimum average angles of incidence on the deflecting surface, $\theta 2$ is a half-view angle, and $\alpha$ is an angle of inclination of the plate in the rotating plane with respect to a main scanning direction.

5 Claims, 5 Drawing Sheets

U.S. PATENT DOCUMENTS

| | | | |
|---|---|---|---|
| 5,861,978 A * | 1/1999 | Kamikubo | 359/208 |
| 5,875,051 A | 2/1999 | Suzuki et al. | |
| 5,986,791 A | 11/1999 | Suzuki et al. | |
| 6,069,724 A | 5/2000 | Hayashi et al. | |
| 6,078,419 A | 6/2000 | Atsuumi | |
| 6,081,386 A | 6/2000 | Hayashi et al. | |
| 6,104,522 A | 8/2000 | Hayashi et al. | |
| 6,104,552 A | 8/2000 | Thau et al. | |
| 6,141,133 A | 10/2000 | Suzuki et al. | |
| 6,185,026 B1 | 2/2001 | Hayashi et al. | |
| 6,198,562 B1 | 3/2001 | Hayashi et al. | |
| 6,198,563 B1 | 3/2001 | Atsuumi | |
| 6,222,662 B1 | 4/2001 | Suzuki et al. | |
| 6,229,638 B1 | 5/2001 | Sakai et al. | |
| 6,233,081 B1 * | 5/2001 | Suzuki et al. | 359/212 |
| 6,317,246 B1 | 11/2001 | Hayashi et al. | |
| 6,369,927 B2 | 4/2002 | Hayashi | |
| 6,388,792 B1 | 5/2002 | Atsuumi et al. | |
| 6,400,391 B1 | 6/2002 | Suhara et al. | |
| 6,400,488 B1 * | 6/2002 | Nagasaka et al. | 359/212 |
| 6,417,509 B1 | 7/2002 | Atsuumi et al. | |
| 6,445,482 B1 | 9/2002 | Hayashi | |
| 6,448,998 B1 * | 9/2002 | Suzuki et al. | 347/258 |
| 6,462,853 B2 | 10/2002 | Hayashi | |
| 6,509,995 B1 | 1/2003 | Suzuki et al. | |
| 6,573,921 B2 | 6/2003 | Hayashi | |
| 6,587,245 B2 | 7/2003 | Hayashi | |
| 6,596,985 B2 * | 7/2003 | Sakai et al. | 250/234 |
| 6,606,179 B2 | 8/2003 | Suzuki et al. | |
| 6,657,765 B2 | 12/2003 | Hayashi et al. | |
| 6,697,183 B2 | 2/2004 | Atsuumi et al. | |
| 6,704,129 B2 | 3/2004 | Sakai et al. | |
| 6,744,545 B2 | 6/2004 | Suhara et al. | |
| 6,757,089 B2 | 6/2004 | Hayashi | |
| 6,768,506 B2 | 7/2004 | Hayashi et al. | |
| 6,771,296 B2 | 8/2004 | Hayashi et al. | |
| 6,771,407 B2 | 8/2004 | Hayashi et al. | |
| 6,781,729 B2 | 8/2004 | Suzuki et al. | |
| 6,833,940 B2 | 12/2004 | Suzuki et al. | |
| 6,956,685 B2 * | 10/2005 | Hayashi | 359/204 |
| 7,106,484 B2 * | 9/2006 | Takeuchi et al. | 359/207 |
| 7,116,347 B2 * | 10/2006 | Kawamura | 347/249 |
| 2002/0041419 A1 * | 4/2002 | Takada et al. | 359/204 |
| 2003/0206323 A1 * | 11/2003 | Itabashi | 359/205 |
| 2005/0093955 A1 | 5/2005 | Izumi et al. | |

OTHER PUBLICATIONS

U.S. Appl. No. 10/635,520, filed Aug. 7, 2003, Sakai, et al.
U.S. Appl. No. 10/421,786, filed Apr. 24, 2003, Atsuumi, et al.
U.S. Appl. No. 10/609,577, filed Jul. 1, 2003, Nakajima, et al.
U.S. Appl. No. 10/438,065, filed May 15, 2003, Sakai, et al.
U.S. Appl. No. 10/395,128, filed Mar. 25, 2003, Hayashi, et al.
U.S. Appl. No. 10/375,036, filed Feb. 28, 2003, Suzuki, et al.
U.S. Appl. No. 10/382,530, filed Mar. 7, 2003, Hayashi, et al.
U.S. Appl. No. 10/223,294, filed Aug. 20, 2002, Satoh, et al.
U.S. Appl. No. 10/242,710, filed Sep. 13, 2002, Hayashi.
U.S. Appl. No. 10/259,769, filed Sep. 30, 2002, Omori, et al.
U.S. Appl. No. 10/278,916, filed Oct. 24, 2002, Suzuki, et al.
U.S. Appl. No. 10/161,756, filed Jun. 5, 2002, Atsuumi, et al.
U.S. Appl. No. 10/161,659, filed Jun. 5, 2002, Suzuki, et al.
U.S. Appl. No. 10/028,698, filed Dec. 28, 2001, Hayashi.
U.S. Appl. No. 10/047,092, filed Jan. 17, 2002, Atsuumi.
U.S. Appl. No. 09/860,520, filed May 21, 2001, Hayashi.
U.S. Appl. No. 09/765,608, filed Jan. 22, 2001, Hayashi, et al.
U.S. Appl. No. 10/460,410, filed Jun. 13, 2003, Sakai, et al.
U.S. Appl. No. 09/716,949, filed Nov. 22, 2000, Atsuumi, et al.
U.S. Appl. No. 09/678,611, filed Oct. 4, 2000, Sakai, et al.
U.S. Appl. No. 10/278,810, filed Oct. 24, 2002, Sakai, et al.
U.S. Appl. No. 10/053,272, filed Jan. 17, 2002, Hayashi.
U.S. Appl. No. 10/716,145, filed Nov. 18, 2003, Sakai, et al.
U.S. Appl. No. 08/095,426, filed Jul. 23, 1993, Unknown.
U.S. Appl. No. 08/031,299, filed Mar. 12, 1993, Atsuumi, et al.
U.S. Appl. No. 11/223,051, filed Sep. 12, 2005, Hayashi et al.
U.S. Appl. No. 11/609,796, filed Dec. 12, 2006, Hayashi, et al.

* cited by examiner

OPTICAL SCANNER AND IMAGE FORMING APPARATUS

CROSS-REFERENCE TO RELATED APPLICATIONS

The present document incorporates by reference the entire contents of Japanese priority documents, 2003-306688 filed in Japan on Aug. 29, 2003 and 2003-328314 filed in Japan on Sep. 19, 2003.

BACKGROUND OF THE INVENTION

1) Field of the Invention

The present invention relates to an optical scanner used in image forming apparatuses such as digital copiers and color laser printers, and to an image forming apparatus utilizing the optical scanner.

2) Description of the Related Art

In recent years, with the development of high-speed color image forming apparatuses, the so-called four-drum tandem digital color copiers and color laser printers have been put to practical use. In such apparatuses, four photosensitive drums are disposed in a direction in which a recording paper is carried. A latent image is formed by exposing simultaneously by using a plurality of scanning optical systems corresponding to each of the photosensitive drums. The latent image formed is visualized in a developing unit that uses developers of different colors such as yellow (Y), magenta (M), cyan (C), and black (K). A color image is obtained by transferring the visualized images on the same recording paper one after the other such that the images are superimposed.

In the four-drum tandem image forming apparatus, as compared to a one-drum image forming apparatus, the colors can be output with the same speed as in monochrome. Therefore, the four-drum tandem image forming apparatus is advantageous for high-speed printing.

A deflector is used jointly with the scanning optical systems. Light is allowed to be incident on the deflector at different angles of incidence and a width in a sub-scanning direction of the deflector is adjusted to be same as a width of deflection of a single light beam. This enables to reduce the size and cost of the deflector.

To block noise that is developed due to rotation of the deflector and to prevent contamination of a reflecting surface of the deflector, the deflector is covered by a housing or a cover and an inlet for incident light beam and an outlet for emergent light beam are sealed up by a noise proof and dustproof transparent parallel plate.

However, if an angle of incidence of a beam that passes through the parallel plate is wide, the image forming is affected to a great extent by a figure tolerance of the parallel plate. Conventionally, technologies have been proposed in Japanese Patent Application Laid-Open Nos. 2001-290095 and H9-274134 to reduce the effect on the image forming.

Moreover, if the parallel plate is disposed near the deflector, light reflected from the parallel plate becomes ghost light and reaches a surface to be scanned, thereby forming a ghost image. Generally, the ghost image that is formed appears as straight black stripes extending in the sub-scanning direction. Conventionally, technologies to remove the ghost image have been proposed in Japanese Patent Application Laid-Open Nos. 2001-290095, H9-274134, and 2001-318335.

SUMMARY OF THE INVENTION

It is an object of the present invention to solve at least the problems in the conventional technology.

An optical scanner according to an aspect of the present invention includes: a plurality of light sources; a deflector including a deflecting-reflecting surface which deflects a plurality of bundles of light beams emitted from the plurality of light sources; a coupling lens which couples the bundles of light beams emitted from the plurality of light sources; a cylindrical lens which directs the bundles of light beams coupled by the coupling lens to the deflector; a parallel plate through which the bundles of light beams incident on and deflected from the deflector pass; and a scanning-imaging optical system which condenses the bundles of light beams deflected from the deflector on a surface to be scanned, wherein the bundles of light beams incident on the deflector have an angle between the bundles in a rotating plane of the deflector, and expressions $$0.6<(\theta 1 max-\alpha)/(\theta 2+\alpha)<1.4$$

and $$0.6<(\theta 1 min-\alpha)/(\theta 2+\alpha)<1.4$$

are satisfied, where $\theta 1max$ and $\theta 1min$ are maximum and minimum values of an average angle of incidence on the deflecting-reflecting surface in the rotating plane of the deflector, $\theta 2$ is a half-view angle corresponding to an effective writing width, and $\alpha$ is an angle of inclination of the parallel plate in the rotating plane of the deflector with respect to a main scanning direction.

An image forming apparatus according to another aspect of the present invention, which forms an electrostatic latent image on an image carrier by electrophotography, having an optical writing unit which performs optical writing on the image carrier and includes: a plurality of light sources; a deflector including a deflecting-reflecting surface which deflects a plurality of bundles of light beams emitted from the plurality of light sources; a coupling lens which couples the bundles of light beams emitted from the plurality of light sources; a cylindrical lens which directs the bundles of light beams coupled by the coupling lens to the deflector; a parallel plate through which the bundles of light beams incident on and deflected from the deflector pass; and a scanning-imaging optical system which condenses the bundles of light beams deflected from the deflector on a surface to be scanned, wherein the bundles of light beams incident on the deflector have an angle between the bundles in a rotating plane of the deflector, and expressions $$0.6<(\theta 1 max-\alpha)/(\theta 2+\alpha)<1.4$$

and $$0.6<(\theta 1 min-\alpha)/(\theta 2+\alpha)<1.4$$

are satisfied, where $\theta 1max$ and $\theta 1min$ are maximum and minimum values of an average angle of incidence on the deflecting-reflecting surface in the rotating plane of the deflector, $\theta 2$ is a half-view angle corresponding to an effective writing width, and $\alpha$ is an angle of inclination of the parallel plate in the rotating plane of the deflector with respect to a main scanning direction.

An optical scanner according to yet another aspect of the present invention includes: a plurality of light sources; a deflector including a deflecting-reflecting surface which deflects a plurality of bundles of light beams emitted from the plurality of light sources; a coupling lens which couples the bundles of light beams emitted from the plurality of light sources; a cylindrical lens which directs the bundles of light beams coupled by the coupling lens to the deflector; a scanning-imaging optical system which condenses the bundles of light beams deflected from the deflector on a surface to be scanned; and a parallel plate on an optical path between the deflector and the scanning-imaging optical system, wherein at least a pair of bundles from among the bundles of light beams incident on the deflector has an angle between each other in a rotating plane of the deflector, positions at which the pair of bundles pass through the parallel plate are separated by a distance in a sub-scanning direction, and the parallel plate is tilted in the sub-scanning direction so that when the pair of bundles are reflected at an incidence plane of the parallel plate, one of the pair of bundles with a wider average angle of incidence on the deflecting-reflecting surface in the rotating plane of the deflector is reflected towards the other one of the pair with a smaller average angle of incidence.

An image forming apparatus according to still another aspect of the present invention, which forms an electrostatic latent image on an image carrier by electrophotography, having an optical writing unit which performs optical writing on the image carrier and includes: a plurality of light sources; a deflector including a deflecting-reflecting surface which deflects a plurality of bundles of light beams emitted from the plurality of light sources; a coupling lens which couples the bundles of light beams emitted from the plurality of light sources; a cylindrical lens which directs the bundles of light beams coupled by the coupling lens to the deflector; a scanning-imaging optical system which condenses the bundles of light beams deflected from the deflector on a surface to be scanned; and a parallel plate on an optical path between the deflector and the scanning-imaging optical system, wherein at least a pair of bundles from among the bundles of light beams incident on the deflector has an angle between each other in a rotating plane of the deflector, positions at which the pair of bundles pass through the parallel plate are separated by a distance in a sub-scanning direction, and the parallel plate is tilted in the sub-scanning direction so that when the pair of bundles are reflected at an incidence plane of the parallel plate, one of the pair of bundles with a wider average angle of incidence on the deflecting-reflecting surface in the rotating plane of the deflector is reflected towards the other one of the pair with a smaller average angle of incidence.

The other objects, features, and advantages of the present invention are specifically set forth in or will become apparent from the following detailed description of the invention when read in conjunction with the accompanying drawings.

DETAILED DESCRIPTION

Exemplary embodiments of an optical scanner and an image forming apparatus according to the present invention are described in detail below with reference to the accompanying drawings.

Figure 1A:
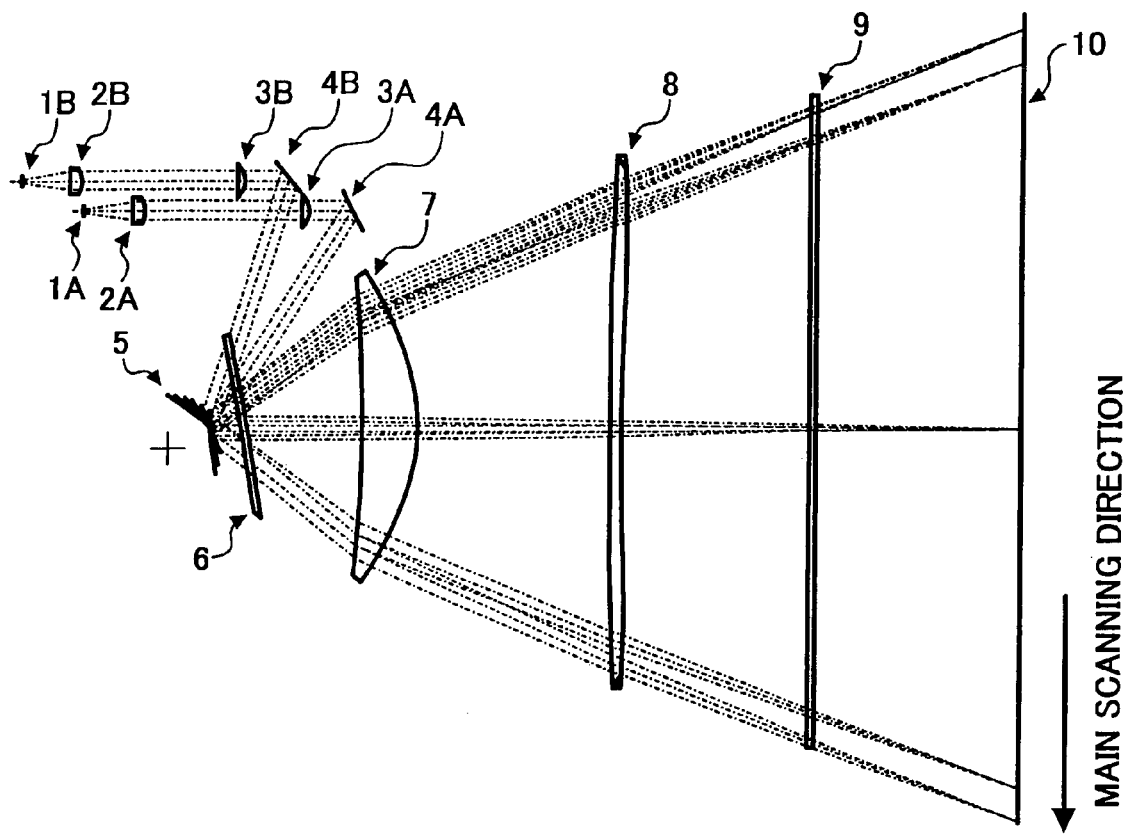
FIG. 1A is an optical arrangement diagram in a surface parallel to a rotating plane of a deflector according to a first embodiment of an optical scanner according to the present invention.
Figure 1B:
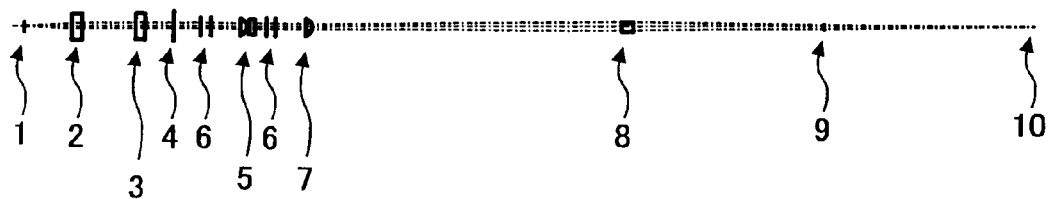
FIG. 1B is cross-sectional view of a sub-scanning illustrating an optical path of a light beam that is emitted from a light source of the scanner in FIG. 1A.

The following is a description of an optical scanner according to the present invention. FIG. 1A is an optical arrangement diagram in a surface parallel to a rotating plane of a deflector according to a first embodiment of the optical scanner according to the present invention. FIG. 1B is cross-sectional view of a sub-scanning illustrating an optical path of a light beam that is emitted from a light source of the scanner in FIG. 1A. An example of a multi-beam scanning optical system that includes two scanning optical systems is described in this case. However, the number of scanning optical systems which are included in the optical scanner according to the present invention is not restricted to two, and three or more than three scanning optical systems may be used. The multi-beam scanning optical system includes semiconductor lasers 1A and 1B, a polygon mirror 5, coupling lenses 2A and 2B, cylindrical lenses 3A and 3B, virtual mirrors 4A and 4B, a noise proof glass 6, a photo-sensitive drum surface 10, a first scanning lens 7, a second scanning lens 8, and a dust proof glass 9. The semiconductor lasers 1A and 1B are light sources. The polygon mirror 5 is a deflector that includes a deflecting-reflecting surface which deflects the light beam from the semiconductor lasers 1A and 1B. The coupling lenses 2A and 2B perform coupling of the light beams from the semiconductor lasers 1A and 1B respectively. The cylindrical lenses 3A and 3B direct the light beams from the coupling lenses 2A and 2B to the polygon mirror 5. The first scanning lens 7 and the second scanning lens 8 are included in optical elements in a scanning-imaging optical system that condenses the light beams from the polygon mirror 5 on the photosensitive drum surface 10 that is scanned. A direction of scanning of the photosensitive drum surface 10 by the light beam is let to be a main scanning direction and a direction orthogonal to the main scanning direction is let to be a sub-scanning direction.

The noise proof glass 6 is disposed in an optical path of incidence and emergence of the laser beams on and from the polygon mirror 5, between the polygon mirror 5 and the scanning-imaging optical system (in the example in FIG. 1A, between the polygon mirror 5 and the first scanning lens 7). More concretely, the noise proof glass 6 is disposed between the polygon mirror 5 and a window frame that is provided on a case which accommodates a motor that drives the polygon mirror 5. The noise proof glass 6 is disposed to prevent noise of the polygon mirror 5.

The dust proof glass 9 is disposed in a window frame for emerging light of a case, such as a plastic case to prevent any dust from entering into the optical scanner that is enclosed and sealed in the case.

Optical scanning by an optical scanner for each of the scanning optical systems is described below.

The semiconductor laser 1A, based on an image signal, emits divergent light beam that is modulated. The divergent light beam that is emitted from the semiconductor laser 1A is coupled by the coupling lens 2A to a beam form that is suitable for the optical system from here onward. Each beam that is coupled is a parallel beam in the same beam form.

The beam that passes through the coupling lens 2A is formed as a line image in the main scanning direction near a deflecting-reflecting surface of the polygon mirror 5, by the cylindrical lens 3A and the virtual mirror 4A.

The polygon mirror 5 is rotated in a clockwise direction on a paper surface at roughly constant speed by a motor which is not shown, and deflects the incident light beam at a constant angular speed. The light beam, which is emitted from the semiconductor laser 1A and deflected at the polygon mirror 5, passes through the noise proof glass 6, the first scanning lens 7, and the second scanning lens 8. The light beam is focused on the photosensitive cylinder surface 10 as a converged beam due to an effect of the first scanning lens 7 and the second scanning lens 8, and is imaged as a beam spot. The converged beam performs optical scanning of the photosensitive cylinder surface 10 from a top side to a bottom side of the paper surface in FIG. 1A at substantially constant speed.

Similarly, the light beam that is emitted from the semiconductor laser 1B passes through the coupling lens 2B, the cylindrical lens 3B, the virtual mirror 4B, the polygon mirror 5, the noise proof glass 6, the first scanning lens 7, and the second scanning lens 8. The light beam is focused on the photosensitive cylinder surface 10 and imaged as a beam spot. The photosensitive drum surface 10 is scanned at a constant speed.

The two scanning optical systems which are included in the optical scanner are disposed with a certain voluntary distance between the two in the sub-scanning direction. In this case, the voluntary distance is a distance that is determined by pixel density. Therefore, two parallel scanning lines separated by a distance in the sub-scanning direction are formed simultaneously on the photosensitive drum surface 10.

The two scanning optical systems are disposed such that the light beam incident on the polygon mirror 5 from the semiconductor laser 1A and the light beam incident on the polygon mirror 5 from the semiconductor laser 1B (hereinafter, "a set of incident light beams") have an opening angle at the deflecting-reflecting surface.

In FIG. 1A, in the set of incident light beams, the light beam that is emitted from the semiconductor laser 1B has an average angle of incidence with the deflecting-reflecting surface in a rotating plane of the deflector (an angle between a direction of incidence on the deflecting-reflecting surface and a normal direction of the deflecting-reflecting surface) wider as compared to that of the light beam that is emitted from the semiconductor laser 1A.

The noise proof glass 6 is tilted towards the sub-scanning direction. This is for causing the incident light beam with a wider average angle of incidence with the deflecting-reflecting surface in the rotating plane of the deflector in the set of incident light beams (the light beam emitted from the semiconductor laser 1B) to reflect in a direction closer to the incident light beam with a smaller average angle of incidence (light beam emitted from the semiconductor laser 1A), if the set of the incident light beams is reflected at a incidence plane of the noise proof glass 6. With such an arrangement, even if a ghost light is developed due to the reflection of the set of incident light beams at the noise proof glass 6, a ghost image can be shifted out of an effective scanning width on the photosensitive drum surface 10, thereby enabling to reduce an effect of the ghost light.

A structure of the optical scanner according to the present invention is described below concretely by citing optical system data.

1) semiconductor laser 1A
wavelength of light source: 655 nm
angle between the incident light beam from the light source and an optical axis of the scanning optical system: 74.55 degrees 2) semiconductor laser 1B
wavelength of light source: 655 nm
angle between the incident light beam from the light source and the optical axis of the scanning optical system: 56.45 degrees 3) coupling lens 2
focal length: 27 mm
coupling effect: collimation 4) polygon mirror 5
number of deflecting-reflecting surfaces: 6
radius of inscribed circle: 18 mm 5) noise proof glass 6
refractive index: 1.514
thickness: 1.9 mm
tilted towards the main scanning direction in the rotating plane of the deflector by: 10 degrees 6) dust proof glass 9
refractive index: 1.514
thickness 1.9 mm Lens data of components from the polygon mirror 5 onward is as shown below.

A shape in the main scanning direction of a first surface (L1R1) of the first scanning lens and both surfaces (L2R1 and L2R2) of the second scanning lens 8 is noncircular. Depth X in the direction of the optical axis of each surface is expressed by the following equation.

$$X = (Y^2/Rm)/[1 + \sqrt{\{1-(1+K)(Y/Rm)^2\}}] + \\ A1 \cdot Y + A2 \cdot Y^2 + A3 \cdot Y^3 + A4 \cdot Y^4 + A5 \cdot Y^5 + A6 \cdot Y^6 + \ldots \quad (1)$$

where Y is a distance from the optical axis in the main scanning direction, Rm is a radius of curvature, K is a conic constant, and An (n=1, 2, 3, . . . ) is a coefficient of higher order. If odd-order coefficients A1, A3, A5, . . . are substituted by a value other than zero, there is an asymmetric form in the main scanning direction. In the following example, only even-order is used and it is symmetric in the main scanning direction.

If Cs (Y) is let to be a radius of curvature in a surface that is orthogonal to a direction of deflection with Y as a variable, then Cs(Y) is expressed by the following equation.

$$Cs(Y)=1/Rs(0)+B1 \cdot Y+B2 \cdot Y^2+B3 \cdot Y^3+B4 \cdot Y^4+B5 \cdot Y^5+\ldots \quad (2),$$

where Rs(0) is a radius of curvature in the sub-scanning direction at an optical axis position and Bn (n=1, 2, 3, . . . ) is a coefficient of higher order. In equation (2), if odd-order coefficients B1, B3, B5, . . . are substituted by a value other than zero, the radius of curvature in the sub-scanning direction is asymmetric with the main scanning direction.

On the other hand, a second surface (L1R2) of the first scanning lens 7 is a co-axial aspheric surface and depth X in a direction of an optical axis is expressed by the following equation.

$$X = (Y^2/R)/[1 + \sqrt{1 - (1+K)(Y/Rm)^2}] + \quad (3)$$
$$A1 \cdot Y + A2 \cdot Y^2 + A3 \cdot Y^3 + A4 \cdot Y^4 + A5 \cdot Y^5 + A6 \cdot Y^6 + \ldots$$

where R is a paraxial radius of curvature in the optical axis, Y is a distance from the optical axis in the main scanning direction, K is a conic constant, and An (n=1, 2, 3, . . . ) is a coefficient of higher order.

Optical system data of the first surface (L1R1) of the first scanning lens 7 is as follows.
Rm=−279.9
Rs=−61.0
K=−2.900000E+01
A4=1.755765E−07
A6=−5.491789E−11
A8=1.087700E−14
A10=−3.183245E−19
A12=−2.635276E−24
B1=−2.066347E−06
B2=5.727737E−06
B3=3.152201E−08
B4=2.280241E−09
B5=−3.729852E−11
B6=−3.283274E−12
B7=1.765590E−14
B8=1.372995E−15
B9=−2.889722E−18
B10=−1.984531E−19

Optical system data of the second surface (L1R2) of the first scanning lens 7 is as follows.
R=−83.6
K=−0.549157
A4=2.748446E−07
A6=−4.502346E−12
A8=−7.366455E−15
A10=1.803003E−18
A12=2.727900E−23

Optical system data of the first surface (L2R1) of the second scanning lens 8 is as follows.
Rm=6950
Rs=110.9
K=0.000000E+00
A4=1.549648E−08
A6=1.292741E−14
A8=−8.811446E−18
A10=−9.182312E−22
B1=−9.593510E−07
B2=−2.135322E−07
B3=−8.079549E−12
B4=2.390609E−12
B5=2.881396E−14
B6=3.693775E−15
B7=−3.258754E−18
B8=1.814487E−20
B9=8.722085E−23
B10=−1.340807E−23

Optical system data of the second surface (L2R2) of the second scanning lens is as follows.
Rm=766
Rs=−68.22
K=0.000000E+00
A4=−1.150396E−07
A6=1.096926E−11
A8=−6.542135E−16
A10=1.984381E−20
A12=−2.411512E−25
B2=3.644079E−07
B4=−4.847051E−13
B6=−1.666159E−16
B8=4.534859E−19
B10=−2.819319E−23

The refractive index of the scanning lens in usable wavelengths is 1.52724 for all.

Optical data related to an optical arrangement is shown below.

distance d1 from the deflecting-reflecting surface to the first surface of the first scanning lens 7=64 mm
central thickness d2 of the first scanning lens 7=22.6 mm
distance d3 from the second surface of the first scanning lens 7 to the first surface of the second scanning lens 8=75.9 mm
central thickness d4 of the second scanning lens 8=4.9 mm
distance d5 from the second surface of the second scanning lens 8 to the surface to be scanned=158.7 mm.

F-numbers in the outermost peripheries and a central image height in the sub-scanning direction are as shown below.
image height=150 mm: 41.5
image height=0 mm: 40.4
image height=−150 mm: 41.0

Figure 2:
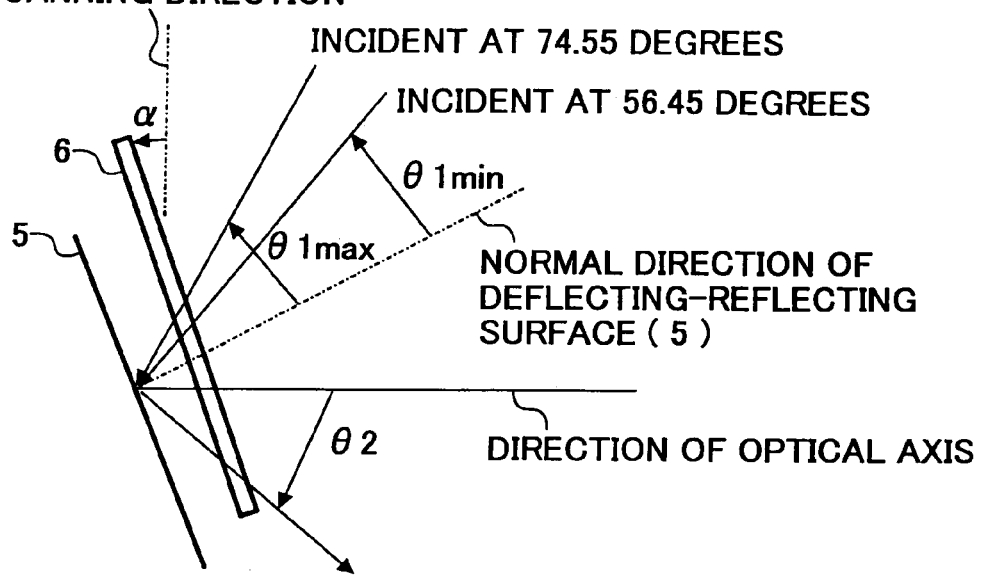
FIG. 2 is an enlarged view of the rotating plane of the deflector near a parallel plate in the optical scanner

A relationship between an angle of inclination of the noise proof glass 6 with the main scanning direction and a main scanning direction field curvature when a figure of tolerance of the main scanning field curvature and the noise proof glass 6 is 400 mR is shown in table 1 for the angles of inclination of 16 degrees (first example), 12 degrees (second example), and 6 degrees (example for comparison). FIG. 2 is an enlarged view of the rotating plane of the deflector near the noise proof glass 6 of the optical scanner shown in FIG. 1A. In FIG. 2, an average angle of incidence with the deflecting-reflecting surface in the rotating plane of the deflector is let to be θ1, the maximum and the minimum values of the average angle of incidence are let to be θ1max and θ1 min, a half-view angle corresponding to an effective writing width is let to be θ2, and an angle of inclination with respect to the main scanning direction of the noise proof glass 6 (parallel plate) in the rotating plane of the deflector is let to be α.

TABLE 1

|  | First example | | Second example | | Example for comparison | |
| --- | --- | --- | --- | --- | --- | --- |
|  | θ1 max | θ1 min | θ1 max | θ1 min | θ1 max | θ1 min |
| θ1 | 74.55 | 56.45 | 74.55 | 56.45 | 74.55 | 56.45 |
| θ2 | 36 | 36 | 36 | 36 | 36 | 36 |
| α | 16 | 16 | 12 | 12 | 6 | 6 |

TABLE 1-continued

| | First example | | Second example | | Example for comparison | |
|---|---|---|---|---|---|---|
| | θ1 max | θ1 min | θ1 max | θ1 min | θ1 max | θ1 min |
| (θ1 − α)/(θ2 + α) | 1.125962 | 0.777885 | 1.303125 | 0.926042 | 1.632143 | 1.20119 |
| Main scanning field curvature | 0.184 | 0.215 | 0.0183 | 0.125 | 0.179 | −0.306 |
| Main scanning field curvature when figure tolerance of noise proof glass is 400 mR | −0.334 | −0.238 | −0.400 | −0.259 | −0.657 | −0.288 |
| Change in main scanning field curvature | −0.518 | −0.453 | −0.583 | −0.474 | −0.836 | 0.018 |

As shown in table 1, in a case of the first example, a change in the field curvature of two beams in the main scanning direction (main scanning field curvature when the figure of tolerance of the noise proof glass 6 is 400 mR—main scanning field curvature) is maintained with proper balance. On the other hand, in a case of the example for comparison, since the field curvature is large, the figure of tolerance of the noise proof glass 6 is to be maintained strictly.

The following conditional equations 1 and 2 are satisfied in the first and the second examples.

$$0.6 < (\theta 1 max - \alpha)/(\theta 2 + \alpha) < 1.4 \quad \text{(conditional equation 1)}$$

$$0.6 < (\theta 1 min - \alpha)/(\theta 2 + \alpha) < 1.4 \quad \text{(conditional equation 2)}$$

Whereas, in the example for comparison, the conditional equation 1 is not satisfied.

The following conditional equation 3 is satisfied in the first and the second examples.

$$(\theta 1 min - \alpha)/(\theta 2 + \alpha) < 1.0 < (\theta 1 max - \alpha)/(\theta 2 + \alpha) \quad \text{(conditional equation 3)}$$

Whereas, in the example for comparison, the conditional equation 3 is not satisfied.

Figure 3:
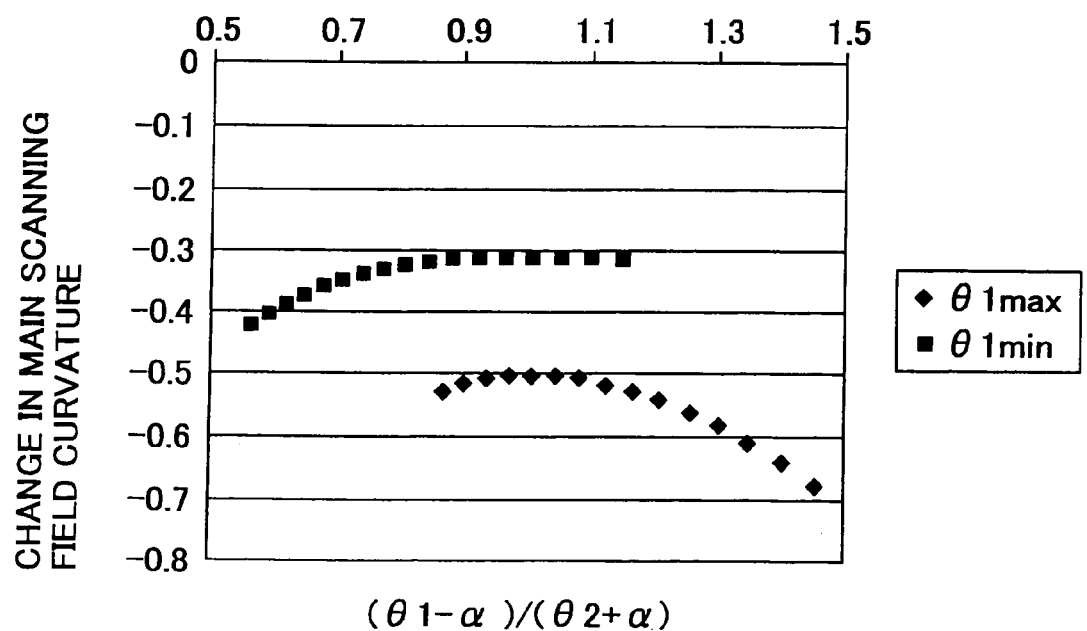
FIG. 3 is a graph of a relationship between $(\theta 1-\alpha)/(\theta 2\alpha)$ and a change in a main scanning field curvature.
Figure 4:
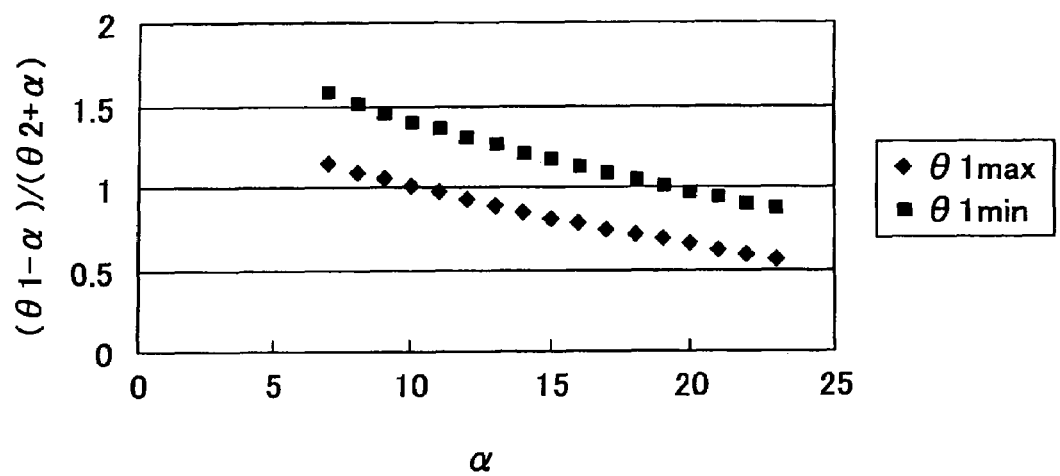
FIG. 4 is a graph of a relationship between $\alpha$ and $(\theta 1-\alpha)/(\theta 2+\alpha)$.
Figure 5:
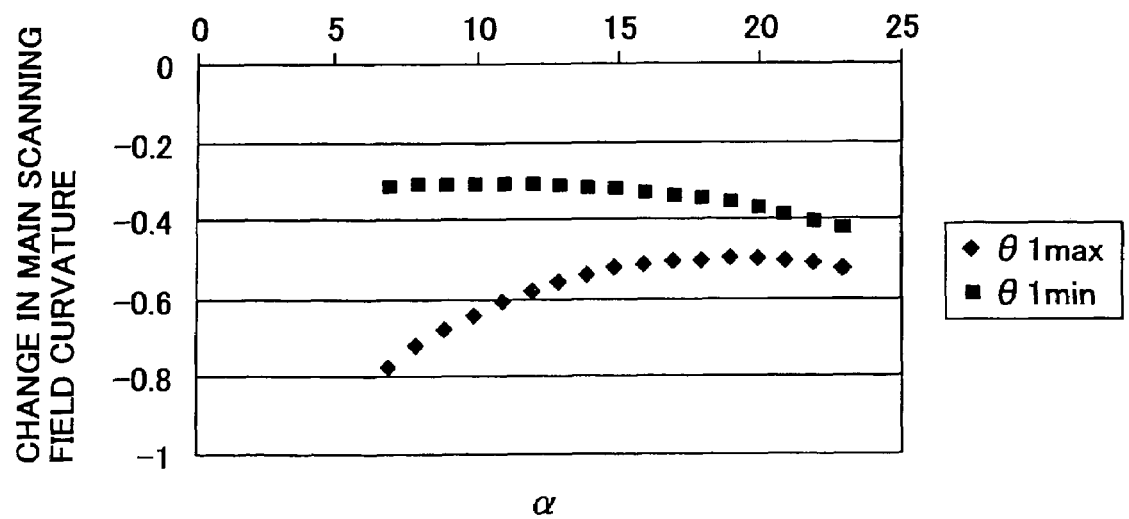
FIG. 5 is a graph of a relationship between $\alpha$ and the change in the main scanning field curvature.

FIGS. 3 to 5 illustrate the validity of the conditional equations 1 to 3. FIG. 3 is a graph of relationship between $(\theta 1 - \alpha)/(\theta 2 + \alpha)$ and the change in the main scanning field curvature when θ1max=74.55 degrees, θ1min=56.45 degrees, θ2=36 degrees, and α=7 degrees to 23 degrees. As shown in FIG. 3, the change in the main scanning field curvature becomes greater outside the range of the conditional equations 1 and 2 thereby causing the performance to deteriorate.

FIG. 4 is a graph of a relationship between α and $(\theta 1 - \alpha)/(\theta 2 + \alpha)$ when θ1max=74.55 degrees, θ1min=56.45 degrees, θ2=36 degrees, and α=7 degrees to 23 degrees. FIG. 5 is a graph of a relationship between α and the change in the main scanning field curvature when θ1max=74.55 degrees, θ1min=56.45 degrees, θ2=36 degrees, and α=7 degrees to 23 degrees. In a range in conditional example 3 shown in FIG. 4, the change in the main scanning field curvature is maintained with proper balance between θ1max and θ1min.

According to the first embodiment described so far, by satisfying the conditional equations 1 and 2, the change in the field curvature in the main scanning direction of the two beams can be maintained with a proper balance. This enables to reduce an effect of the figure tolerance of the noise proof glass 6 on the imaging capability. In other words, even in a structure in which the parallel plate is disposed in an inlet and outlet for incident and emergent light beam to an from the deflector that is shared by a plurality of scanning optical systems, the effect of the figure tolerance of the parallel plate (noise proof glass 6) on the imaging capability can be reduced.

Figure 6:
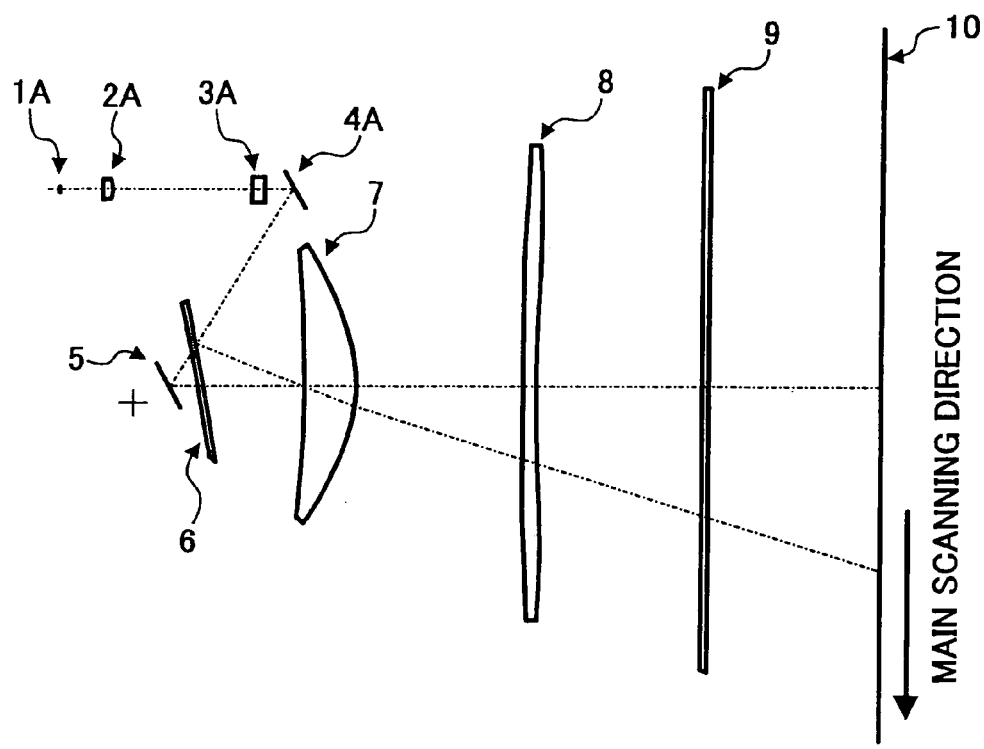
FIG. 6 is an optical arrangement diagram of an optical path of a light beam that is emerged from one of light sources of the optical scanner.
Figure 7:
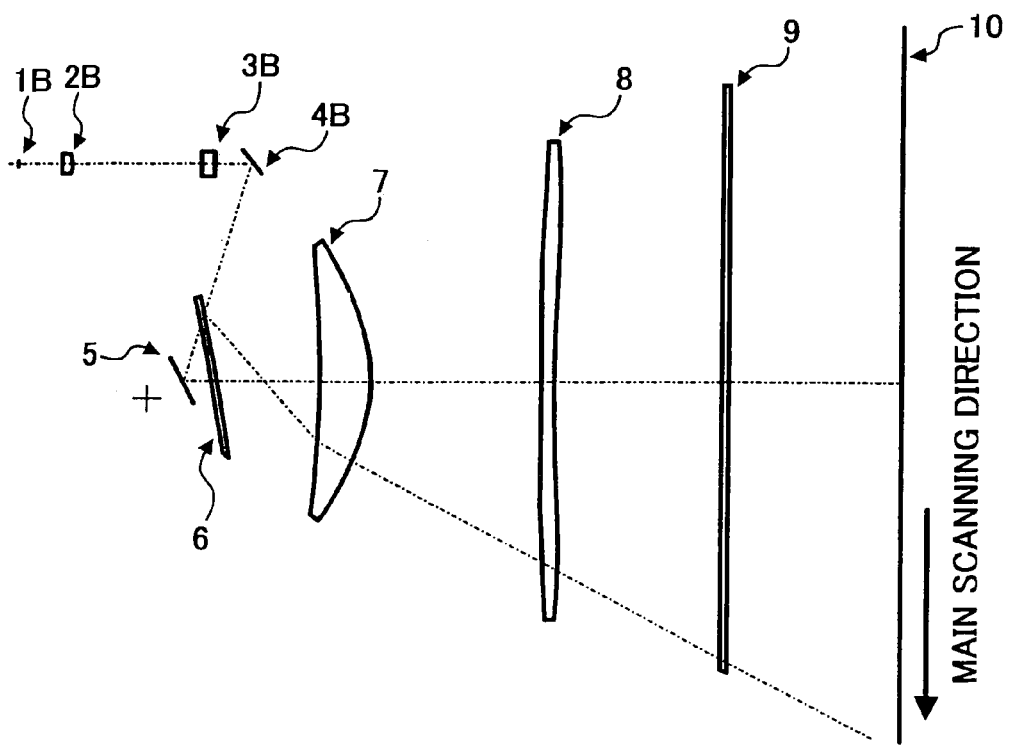
FIG. 7 is an optical arrangement diagram of an optical path of a light beam that is emitted from another light source of the optical scanner.

The following is a description of an optical scanner according to a second embodiment. A structure of the optical scanner is similar to that in FIGS. 1A, 1B, and 2. FIG. 6 is an optical arrangement diagram in a surface parallel to the rotating plane of the deflector, of an optical path of ghost light reflected from the noise proof glass 6 upon emitting from the semiconductor laser 1A. FIG. 7 is an optical arrangement diagram in a surface parallel to the rotating plane of the deflector, of an optical path of ghost light reflected from the noise proof glass 6 upon being emitted from the semiconductor laser 1B. In FIG. 6 where the average angle of incidence is smaller, the ghost light reaches the photosensitive drum surface 10. On the other hand, in FIG. 7 where the average angle of incidence is wider, the ghost light is much far away from the photosensitive drum surface 10.

Figure 8:
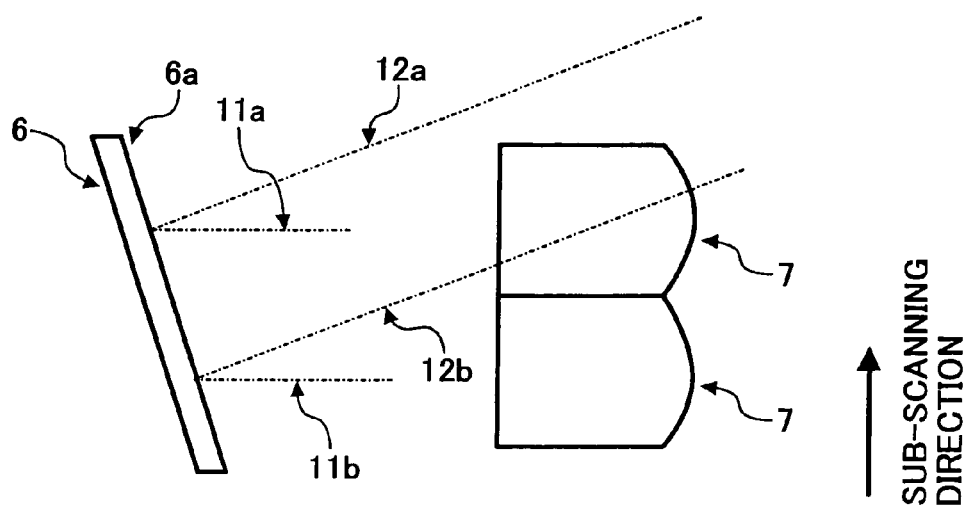
FIG. 8 is a cross-sectional view of the sub-scanning near the parallel plate in the optical scanner.

FIG. 8 is a cross-sectional view of the sub-scanning near the noise proof glass 6 in the optical scanner in which the ghost light is developed due to reflection at the noise proof glass 6 shown in FIGS. 6 and 7. Reference numeral 11*a* denotes a main ray of light beam of incident light traveling from the semiconductor laser 1A to the deflecting-reflecting surface. Reference numeral 11*b* denotes a main ray of light beam of incident light traveling from the semiconductor laser 1B to the deflecting-reflecting surface. Reference numeral 12*a* denotes light reflected at a incidence plane 6*a* which is incident as the main ray 11*a* of incident light beam emitted from the semiconductor laser 1A without passing through the noise proof glass 6. Reference numeral 12*b* denotes light reflected at the incidence plane 6a which is incident as the main ray 11b of incident light beam emitted from the semiconductor laser 1B without passing through the noise proof glass 6.

Since the semiconductor lasers 1A and 1B are disposed at a voluntary distance from each other in the sub-scanning direction, positions of passing of the set of incident light beams through the noise proof glass 6 are separated from each other in the sub-scanning direction. In other words, the two incident light beams are separated spatially as shown in FIG. 8.

As shown in FIG. 8, the noise proof glass 6 is tilted towards the sub-scanning direction. This is for causing the light beam with the wider average angle of incidence with the deflecting-reflecting surface in the rotating plane of the deflector (the light beam emitted from the semiconductor laser 1B) to reflect in a direction closer to the incident light beam with a smaller average angle of incidence (light beam emitted from the semiconductor laser 1A), if the set of the incident light beams is reflected at the incidence plane of the noise proof glass 6. Thus, the ghost light of the incident light with the smaller average angle of incidence is caused to pass through a range that is outside the effective scanning width of the photosensitive drum surface 10 in the sub-scanning direction, thereby preventing the ghost light. In FIG. 8, the reflected light 12b is reflected towards the reflected light 12a.

In this case, no imaging takes place on the image plane since the reflected light 12a does not pass through the first scanning lens 7. Even if the reflected light 12b passes through the first scanning lens 7 and reaches the photosensitive drum surface 10, since it is shifted away substantially in the main scanning direction as shown in FIG. 7, there is no effect on the image formation. In FIG. 8, though the reflected light 12 does not pass through the first scanning lens 7, it may pass through a range that is out of the effective scanning width of the photosensitive drum surface 10 in the sub-scanning direction. Even if the reflected light 12b passes through the effective scanning width of the photosensitive drum surface 10 in the sub-scanning direction, the reflected light is out of the effective scanning width of the photosensitive drum surface 10 in the main scanning direction.

With such an arrangement of the optical scanner according to the present invention, even if the ghost light is developed due to reflection of the set of incident light beams at the noise proof glass 6, the ghost image can be shifted out of the effective scanning width on the photosensitive drum surface 10, thereby enabling to reduce the effect of the ghost light.

The number of scanning optical systems which are included in the optical scanner according to the present invention is not restricted to two, and three or more than three scanning optical systems may be used. When three or more than three scanning optical systems are used, the optical scanner is to be structured such that at least one set of incident light beams from among the incident light beams emitted from a plurality of light sources to the deflector, satisfies the relationships described so far.

The structure of the optical scanner according to the present invention is described below concretely by citing optical system data.

1) semiconductor laser 1A
wavelength of light source: 655 nm
average angle of incidence with the deflecting-reflecting surface in the rotating plane of the deflector: 37.275 degrees 2) semiconductor laser 1B
wavelength of light source: 655 nm
average angle of incidence with the deflecting-reflecting surface in the rotating plane of the deflector: 28.225 degrees 3) coupling lens 2
focal length: 27 mm
coupling effect: collimation 4) polygon mirror 5
number of deflecting-reflecting surfaces: 6
radius of inscribed circle: 18 mm 5) noise proof glass 6
refractive index: 1.514
thickness: 1.9 mm
tilted towards the main scanning direction in the rotating plane of the deflector by: 16 degrees
tilted towards the sub-scanning direction by: 1.3 degrees Lens data of components from the polygon mirror 5 onward is as shown below.

The shape in the main scanning direction of the first surface (L1R1) of the first scanning lens 7 and the both surfaces (L2R1 and L2R2) of the second scanning lens 8 is noncircular. Depth X in the direction of the optical axis of each surface is expressed by the following equation.

$$X = (Y^2/Rm)/[1 + \sqrt{1 - (1+K)(Y/Rm)^2}] + \\ A1 \cdot Y + A2 \cdot Y^2 + A3 \cdot Y^3 + A4 \cdot Y^4 + A5 \cdot Y^5 + A6 \cdot Y^6 + ... \quad (1)$$

where Y is a distance from the optical axis in the main scanning direction, Rm is a radius of curvature, K is a conic constant, and An (n=1, 2, 3, . . . ) is a coefficient of higher order. If the odd-order coefficients A1, A3, A5, . . . are substituted by a value other than zero, there is an asymmetric form in the main scanning direction. In the following example, only ever-order is used and it is symmetric in the main scanning direction.

If Cs(Y) is let to be the radius of curvature in the surface that is orthogonal to the direction of deflection with Y as a variable, then Cs(Y) is expressed by the following equation.

$$Cs(Y) = 1/Rs(0) + B1 \cdot Y + B2 \cdot Y^2 + B3 \cdot Y^3 + B4 \cdot Y^4 + B5 \cdot Y^5 + .. \quad (2),$$

where Rs(0) is a radius of curvature in the sub-scanning direction at an optical axis position and Bn (n=1, 2, 3, . . . ) is a coefficient of higher order. In equation (2), if odd-order coefficients B1, B3, B5, . . . are substituted by a value other than zero, the radius of curvature in the sub-scanning direction is asymmetric in the main scanning direction.

On the other hand, the second surface (L1R2) of the first scanning lens 7 is a coaxial aspheric surface and depth X in the direction of the optical axis is expressed by the following equation.

$$X = (Y^2/R)/[1 + \sqrt{1 - (1+K)(Y/Rm)^2}] + \\ A1 \cdot Y + A2 \cdot Y^2 + A3 \cdot Y^3 + A4 \cdot Y^4 + A5 \cdot Y^5 + A6 \cdot Y^6 + ... \quad (3)$$

where R is a paraxial radius of curvature in the optical axis, Y is a distance from the optical axis in the main scanning direction, K is a conic constant, and An (n=1, 2, 3, . . . ) is a coefficient of higher order.

The optical system data of the first surface (L1R1) of the first scanning lens 7 is as follows.
Rm=−279.9
Rs=−61.0
K=−2.900000E+01
A4=1.755765E−07
A6=−5.491789E−11
A8=1.087700E−14
A10=−3.183245E−19
A12=−2.635276E−24
B1=−2.066347E−06
B2=5.727737E−06
B3=3.152201E−08
B4=2.280241E−09
B5=−3.729852E−11
B6=−3.283274E−12
B7=1.765590E−14
B8=1.372995E−15
B9=−2.889722E−18
B10=−1.984531E−19

The optical system data of the second surface (L1R2) of the first scanning lens 7 is as follows.
R=−83.6
K=−0.549157
A4=2.748446E−07
A6=−4.502346E−12
A8=−7.366455E−15
A10=1.803003E−18
A12=2.727900E−23

The optical system data of the first surface (L2R1) of the second scanning lens 8 is as follows.
Rm=6950
Rs=110.9
K=0.000000E+00
A4=1.549648E−08
A6=1.292741E−14
A8=−8.811446E−18
A10=−9.182312E−22
B1=−9.593510E−07
B2=−2.135322E−07
B3=−8.079549E−12
B4=2.390609E−12
B5=2.881396E−14
B6=3.693775E−15
B7=−3.258754E−18
B8=1.814487E−20
B9=8.722085E−23
B10=−1.340807E−23

The optical system data of the second surface (L2R2) of the second scanning lens is as follows.
Rm=766
Rs=−68.22
K=0.000000E+00
A4=−1.150396E−07
A6=1.096926E−11
A8=−6.542135E−16
A10=1.984381E−20
A12=−2.411512E−25
B2=3.644079E−07
B4=−4.847051E−13
B6=−1.666159E−16
B8=4.534859E−19
B10=−2.819319E−23

The refractive index of the scanning lens in usable wavelengths is 1.52724 for all.

The optical data related to the optical arrangement is shown below.

distance d1 from the deflecting-reflecting surface to the first surface of the first scanning lens 7=64 mm central thickness d2 of the first scanning lens 7=22.6 mm distance d3 from the second surface of the first scanning lens 7 to the first surface of the second scanning lens 8=75.9 mm central thickness d4 of the second scanning lens 8=4.9 mm distance d5 from the second surface of the second scanning lens 8 to the surface to be scanned=158.7 mm.

F-numbers in the outermost peripheries and the central image height in the sub-scanning direction are as shown below.

image height=150 mm: 41.5 image height=0 mm: 40.4 image height=−150 mm: 41.0

The semiconductor laser 1B is at an average angle of incidence of 37.275 degrees with the deflecting-reflecting surface in the rotating plane of the deflector. The incident light beam which is emitted from the semiconductor laser 1B is reflected when incident on the incidence plane of the noise proof glass 6, thereby developing the ghost light. The image height of the ghost image which is formed by the ghost light is approximately −170 mm. Therefore it does not affect the image plane in a range of the image height from −150 mm to 150 mm. On the other hand, the semiconductor laser 1A is at an average angle of incidence of 28.225 degrees with the deflecting-reflecting surface in the rotating plane of the deflector. The incident light beam which is emitted from the semiconductor laser 1A is reflected when incident on the incidence plane of the noise proof glass 6, thereby developing the ghost light. The image height of the ghost image which is formed by the ghost light is approximately −110 mm. Therefore, as shown in FIG. 4, the noise proof glass 6 is tilted in the sub-scanning direction so that the ghost light does not enter into the scanning-imaging optical system.

A relationship among the main light ray, upper light ray, and lower light ray on each lens surface when an effective height of the first scanning lens 7 is 1.70 mm and the effective height of the second scanning lens 8 is 3.00 mm is as shown in the table below (in mm).

| Lens surface | Effective height of lens | Main light ray | Upper light ray | Lower light ray |
| --- | --- | --- | --- | --- |
| L1R1 | 1.70 | 2.00 | 2.40 | 1.60 |
| L1R2 | 1.70 | 2.75 | 3.34 | 2.16 |
| L2R1 | 3.00 | 5.65 | 7.03 | 4.28 |
| L2R2 | 3.00 | 5.68 | 7.07 | 4.30 |

As shown in the table above, the semiconductor laser 1B is at an average angle of incidence of 28.225 degrees with the deflecting-reflecting surface in the rotating plane of the deflector. Since, the light beam which is emitted from the semiconductor laser 1B does not pass through the second scanning lens, the ghost light does not form an image on the image plane.

In this case, to shift the ghost image assuredly out of the effective scanning width, the following condition is required to be satisfied.

$$2\theta1\max - 2\alpha > \theta2$$

where $\theta1\max$: wider average angle of incidence at the deflecting-reflecting surface in the rotating plane of the deflector from the set of incident light beams $\alpha$: angle of inclination of the parallel plate in the rotating plane of the deflector $\theta2$: half-view angle equivalent to the effective scanning width In this example, since $\theta1\max = 37.275$ degrees $\alpha = 16$ degrees $2\theta2 = 72$ degrees, $2\theta1\max - 2\alpha = 74.55 - 32 = 42.55 < \theta2 = 36$ and the condition is satisfied.

Thus, according to the second embodiment, even if the light beam incident on the deflector is reflected from the parallel plate which is disposed between the deflector and the scanning-imaging optical system and the ghost light is developed, the ghost image can be shifted out of the effective scanning width, thereby enabling to reduce the effect of the ghost light.

Figure 9:
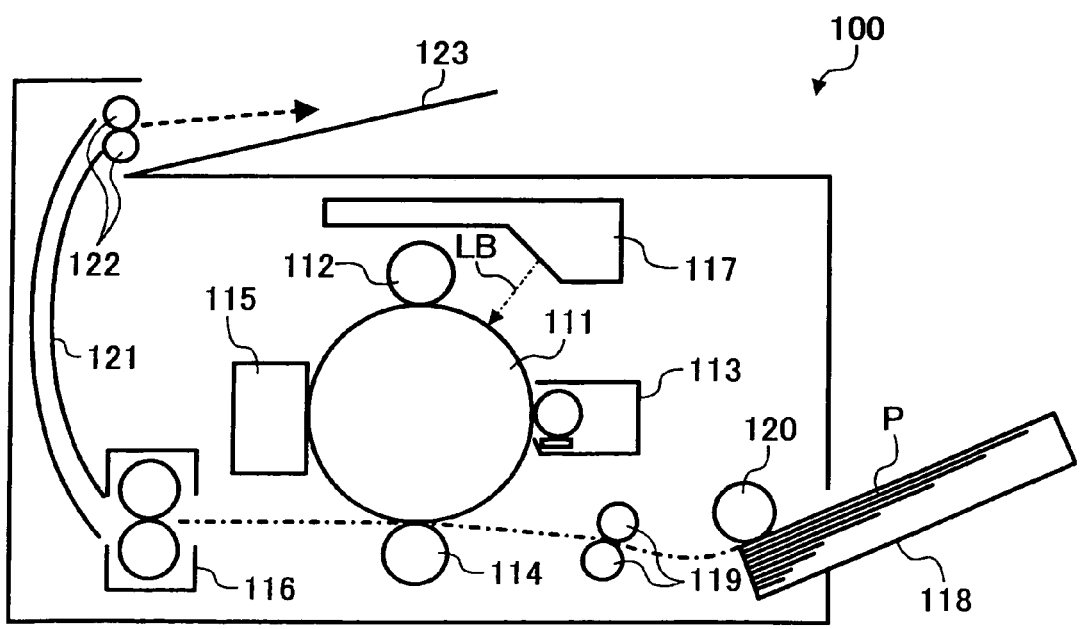
FIG. 9 is a center cross-sectional view of an image forming apparatus according to an embodiment of the present invention.

The following is a description of the image forming apparatus according to the present invention. FIG. 9 is a center cross-sectional view of the image forming apparatus in which the optical scanner according to the first and the second embodiment is used. The image forming apparatus is a laser printer. A laser printer 100 includes an optical scanner 117, a latent image carrier 111, a developing unit, a transferring unit and other units that perform electrophotographic process. The optical scanner 117 exposes an image and an electrostatic latent image is formed on the latent image carrier 111, which is a cylindrical shaped photoconductive photosensitive drum. The developing unit visualizes the electrostatic latent image and the transferring unit transfers the visualized toner image to a recording paper.

The image forming apparatus 100 includes process members according to the electrophotographic process such as a charging roller 112 as a charging unit, a developing unit 113, a transfer roller 114, and a cleaning unit around the latent image carrier 111. A corona charger can also be used as a charging unit.

The optical scanner 117 is an optical writing unit that performs optical writing on the image carrier and performs exposing in the electrophotographic process. The optical scanner 117 scans a surface of the latent image carrier 111 which is charged uniformly by the charging roller 112. The electrostatic latent image that is formed is the so called negative latent image with an exposed image portion. The developing unit 113 performs inversion developing of the electrostatic latent image and the toner image is formed on the latent image carrier 111.

The image forming apparatus includes a cassette 118 which stores transfer papers P and is detachable from the laser printer 100. In the image forming apparatus shown FIG. 9, a sheet of paper at the top of the transfer papers P is fed by a paper feeding roller 120. A tip of the transfer paper P is held between the registering rollers 119. The registering rollers 119 send the transfer paper P to a transferring section at a timing matched with the timing of shift of the toner image to a position of transfer. The transfer paper P is overlapped with the toner image in the transferring section and the toner image is transferred electrostatically by an action of the transfer roller 114.

The transfer paper P with the toner image transferred on it is sent to a fixing unit 116 where the toner image is fixed. The transfer paper P then passes through a transporting path 121 and is discharged on a tray 123 by a pair of discharging rollers 122.

The cleaning unit 115 cleans the surface of the latent image carrier 111 on which the toner image is transferred, and paper dust and toner remained are removed.

Use of the optical scanner 117 as the optical scanner according to the present invention, enables to reduce effect on the imaging capability due the figure tolerance of the parallel plate in the optical scanner and to form a clear image.

The process of image formation is described by assuming an image formation with a single color. However, the present invention is not restricted to the image formation with a single color and can also be applied to a color image forming apparatus in which an image is formed by superimposing images of a plurality of colors. In such a case, the present invention can be applied to an image forming apparatus in which the optical writing unit is used jointly for the plurality of colors. In other words, such an image forming apparatus includes one optical writing unit and one image carrier. Optical writing is performed with an image signal for each single color and an image is developed by using a toner of the corresponding color. The developed image is transferred to a transfer paper. Next, the optical writing is performed with an image signal for another color and an image is developed by using a toner of the corresponding color. The developed image is transferred to the transfer paper. Thus, the image formation for each color is performed and the images are transferred and superimposed on the same transfer paper.

The present invention can also be applied to a so called tandem image forming apparatus in which the optical writing unit is disposed as an exposing unit for each color. In other words, such an image forming apparatus includes a plurality of optical writing units and image carriers corresponding to each color. An optical writing unit corresponding to an image signal for each color writes an image on the corresponding image carrier. The image that is written is developed by a toner of the corresponding color. The images of corresponding color are transferred and superimposed on the same transfer sheet. The tandem image forming apparatus is advantageous for light-beam writing of an image and high-speed image formation.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical scanner comprising:
   a plurality of light sources, each of which produces a bundle of light beams;
   a deflector including a deflecting-reflecting surface which deflects a plurality of the bundles of light beams emitted from the plurality of light sources;
   a coupling lens which couples the bundles of light beams emitted from the plurality of light sources;
   a cylindrical lens which directs the bundles of light beams coupled by the coupling lens to the deflector, wherein each individual light beam of each of the bundles of light beams from a respective one of the plurality of light sources is incident on the deflecting-reflecting surface of the deflector with an angle of incidence, wherein the average of the angles of incidence of the individual light beams of each of the bundles of light beams is an average angle of incidence for the respective bundle of light beams, and wherein the average angles of incidence for the bundles of light beams from the plurality of light sources have values between a maximum and a minimum value;

a parallel plate through which the bundles of light beams incident on and deflected from the deflector pass; and a scanning-imaging optical system which condenses the bundles of light beams deflected from the deflector on a surface to be scanned, wherein the bundles of light beams incident on the deflector have an angle between the bundles in a rotating plane of the deflector, and expressions $$0.6 < (\theta 1 max - \alpha)/(\theta 2 + \alpha) < 1.4$$

$$0.6 < (\theta 1 min - \alpha)/(\theta 2 + \alpha) < 1.4$$

and $$(\theta 1 min - \alpha)/(\theta 2 + \alpha) < 1.0 < (\theta 1 max - \alpha)/(\theta 2 + \alpha)$$

are satisfied, where $\theta 1max$ and $\theta 1min$ are maximum and minimum values of an average angle of incidence on the deflecting-reflecting surface in the rotating plane of the deflector, $\theta 2$ is a half-view angle corresponding to an effective writing width, and $\alpha$ is an angle of inclination of the parallel plate in the rotating plane of the deflector with respect to a main scanning direction.

2. The optical scanner according to claim 1, wherein the parallel plate is tilted with respect to a sub-scanning direction.

3. An image forming apparatus which forms an electrostatic latent image on an image carrier by electrophotography, comprising an optical writing unit which performs optical writing on the image carrier and includes:

a plurality of light sources, each of which produces a bundle of light beams;

a deflector including a deflecting-reflecting surface which deflects a plurality of the bundles of light beams emitted from the plurality of light sources;

a coupling lens which couples the bundles of light beams emitted from the plurality of light sources;

a cylindrical lens which directs the bundles of light beams coupled by the coupling lens to the deflector, wherein each individual light beam of each of the bundles of light beams from a respective one of the plurality of light sources is incident on the deflecting-reflecting surface of the deflector with an angle of incidence, wherein the average of the angles of incidence of the individual light beams of each of the bundles of light beams is an average angle of incidence for the respective bundle of light beams, and wherein the average angles of incidence for the bundles of light beams from the plurality of light sources have values between a maximum and a minimum value;

a parallel plate through which the bundles of light beams incident on and deflected from the deflector pass; and a scanning-imaging optical system which condenses the bundles of light beams deflected from the deflector on a surface to be scanned, wherein the bundles of light beams incident on the deflector have an angle between the bundles in a rotating plane of the deflector, and expressions $$0.6 < (\theta 1 max - \alpha)/(\theta 2 + \alpha) < 1.4$$

$$0.6 < (\theta 1 min - \alpha)/(\theta 2 + \alpha) < 1.4$$

and $$(\theta 1 min - \alpha)/(\theta 2 + \alpha) < 1.0 < (\theta 1 max - \alpha)/(\theta 2 + \alpha)$$

are satisfied, where $\theta 1max$ and $\theta 1min$ are maximum and minimum values of an average angle of incidence on the deflecting-reflecting surface in the rotating plane of the deflector, $\theta 2$ is a half-view angle corresponding to an effective writing width, and $\alpha$ is an angle of inclination of the parallel plate in the rotating plane of the deflector with respect to a main scanning direction.

4. An optical scanner comprising:

a plurality of light sources, each of which produces a bundle of light beams;

a deflector including a deflecting-reflecting surface which deflects the plurality of bundles of light beams emitted from the plurality of light sources, wherein each individual light beam of each of the bundles of light beams from a respective one of the plurality of light sources is incident on the deflecting-reflecting surface of the deflector with an angle of incidence, and wherein the average of the angles of incidence of the individual light beams of each of the bundles of light beams is an average angle of incidence for the respective bundle of light beams;

a coupling lens which couples the bundles of light beams emitted from the plurality of light sources;

a cylindrical lens which directs the bundles of light beams coupled by the coupling lens to the deflector;

a scanning-imaging optical system which condenses the bundles of light beams deflected from the deflector on a surface to be scanned; and a parallel plate on an optical path between the deflector and the scanning-imaging optical system, wherein at least a pair of bundles from among the bundles of light beams incident on the deflector has an angle between each other in a rotating plane of the deflector, whereby one of the pair of bundles is reflected at an incidence plane of the parallel plate with a wider average angle of incidence and the other one of the pair of bundles is reflected at the incidence plane of the parallel plate with a smaller average angle of incidence, positions at which the pair of bundles pass through the parallel plate are separated by a distance in a sub-scanning direction, and the parallel plate is tilted in the sub-scanning direction so that when the pair of bundles are reflected at an incidence plane of the parallel plate, the one of the pair of bundles with a wider average angle of incidence is reflected towards the other one of the pair with a smaller average angle of incidence, wherein when an expression $$2\theta 1 max - 2\alpha > \theta 2$$

is satisfied, where $\theta 1max$ is an average angle of incidence of the one of the pair of bundles with the wider average angle of incidence, $\alpha$ is an angle of inclination of the parallel plate in the rotating plane of the deflector, and $\theta 2$ is a half-view angle corresponding to an effective scanning width, wherein the parallel plate is tilted with respect to the sub-scanning direction so that the other one of the pair with the smaller average angle of incidence does not enter the scanning-imaging optical system.

5. An image forming apparatus which forms an electrostatic latent image on an image carrier by electrophotography, comprising an optical writing unit which performs optical writing on the image carrier and includes:

a plurality of light sources, each of which produces a bundle of light beams;

a deflector including a deflecting-reflecting surface which deflects the plurality of bundles of light beams emitted from the plurality of light sources, wherein each individual light beam of each of the bundles of light beams from a respective one of the plurality of light sources is incident on the deflecting-reflecting surface of the deflector with an angle of incidence, and wherein the average of the angles of incidence of the individual light beams of each of the bundles of light beams is an average angle of incidence for the respective bundle of light beams;

a coupling lens which couples the bundles of light beams emitted from the plurality of light sources;

a cylindrical lens which directs the bundles of light beams coupled by the coupling lens to the deflector;

a scanning-imaging optical system which condenses the bundles of light beams deflected from the deflector on a surface to be scanned; and a parallel plate on an optical path between the deflector and the scanning-imaging optical system, wherein at least a pair of bundles from among the bundles of light beams incident on the deflector has an angle between each other in a rotating plane of the deflector, whereby one of the pair of bundles is reflected at an incidence plane of the parallel plate with a wider average angle of incidence and the other one of the pair of bundles is reflected at the incidence plane of the parallel plate with a smaller average angle of incidence, positions at which the pair of bundles pass through the parallel plate are separated by a distance in a sub-scanning direction, and the parallel plate is tilted in the sub-scanning direction so that when the pair of bundles are reflected at an incidence plane of the parallel plate, the one of the pair of bundles with a wider average angle of incidence is reflected towards the other one of the pair with a smaller average angle of incidence, wherein when an expression $$2\theta 1max - 2\alpha > \theta 2$$

is satisfied, where $\theta 1max$ is an average angle of incidence of the one of the pair of bundles with the wider average angle of incidence, $\alpha$ is an angle of inclination of the parallel plate in the rotating plane of the deflector, and $\theta 2$ is a half-view angle corresponding to an effective scanning width, wherein the parallel plate is tilted with respect to the sub-scanning direction so that the other one of the pair with the smaller average angle of incidence does not enter the scanning-imagine optical system.

* * * * *